United States Patent [19]

Wendel

[11] Patent Number: 5,549,525
[45] Date of Patent: Aug. 27, 1996

[54] ELECTRONIC CONTROL PROCESS FOR AN AUTOMATIC TRANSMISSION

[75] Inventor: Peter Wendel, Kressbronn, Germany

[73] Assignee: ZF Friedrichshafen, Germany

[21] Appl. No.: 351,442

[22] PCT Filed: Jul. 10, 1993

[86] PCT No.: PCT/EP93/01815

§ 371 Date: Dec. 14, 1994

§ 102(e) Date: Dec. 14, 1994

[87] PCT Pub. No.: WO94/01701

PCT Pub. Date: Jan. 20, 1994

[30] Foreign Application Priority Data

Jul. 14, 1992 [DE] Germany .......................... 42 23 084.5

[51] Int. Cl.⁶ .................................................. B60K 41/20
[52] U.S. Cl. ........................... 477/93; 477/114; 477/900; 477/901
[58] Field of Search ................................. 477/70, 77, 79, 477/92, 93, 114, 901, 900

[56] References Cited

U.S. PATENT DOCUMENTS

| | | |
|---|---|---|
| 4,363,389 | 12/1982 | Zaunberger et al. . |
| 4,513,639 | 4/1985 | Hiramatsu . |
| 4,648,289 | 3/1987 | Kubo et al. . |
| 4,804,074 | 2/1989 | Kori ..................................... 477/901 X |
| 4,821,854 | 4/1989 | Koshizawa ......................... 477/901 X |
| 4,854,194 | 8/1989 | Kaneko et al. ..................... 477/901 X |
| 4,891,758 | 1/1990 | Simonyi et al. .................... 477/114 X |
| 4,930,374 | 6/1990 | Simonyi et al. .................... 477/901 X |
| 5,170,679 | 12/1992 | Merkle . |
| 5,315,899 | 5/1994 | Mochizuki .......................... 477/901 X |
| 5,389,050 | 2/1995 | Sakai et al. ........................ 477/901 X |
| 5,406,862 | 4/1995 | Amsallen ........................... 477/900 X |

FOREIGN PATENT DOCUMENTS 4118474 1/1992 Germany .

*Primary Examiner*—Charles A. Marmor
*Assistant Examiner*—Peter Kwon
*Attorney, Agent, or Firm*—Davis, Bujold & Streck

[57] ABSTRACT

A process is disclosed for electronically controlling an automatic transmission in which the torque transmission is reduced when the engine throttle setting and vehicle speed are below a threshold. The transmitted torque causes the vehicle to creep slightly, warning the driver that a gear is engaged. The slant and load of the vehicle are taken into account for controlling the drive torque.

4 Claims, 2 Drawing Sheets

5,549,525

ELECTRONIC CONTROL PROCESS FOR AN AUTOMATIC TRANSMISSION

The invention relates to a process for the control of an automatic transmission in accordance with the preamble of the first claim.

BACKGROUND OF THE INVENTION

In many cases, vehicles having automatic transmissions begin to creep upon engagement of a gear and idling speed of the engine, since the latter generates a torque upon the transmission even when no throttle is actuated.

DE 41 18 474 A1 has disclosed an anti-creep control for an automatic vehicle transmission. When the vehicle speed and opening angle of the engine throttle valve are zero or near zero and the brake is actuated, the transmission of the torque is interrupted or reduced. The anti-creep control remains activated as long as the engine runs at idle speed and the vehicle remains,braked even if the brake system is released.

The fact that when braking the vehicle on an incline, it can be protected against unintended backward rolling with only one brake has proved disadvantageous in the case of a complete interruption of the torque.

SUMMARY OF THE INVENTION

The invention is based on the problem of preventing the vehicle from rolling backward on an incline when the torque diminishes. The problem is solved according to the invention by the characteristic features of claim 1. It is advantageous here that the remaining drive torque overcompensates for the influences, produces a slight creep and thereby warns the driver that a gear is still engaged. The magnitude of the drive torque needed for this depends on the inclination of the vehicle and also on the vehicle load.

The inclination of the vehicle is detected by a gradient sensor which can be an accelerometer. A signal is evaluated only when the marginal conditions, the vehicle speed and opening of the throttle valve, are zero or near zero in order to ensure that the vehicle is not in an acceleration condition. A characteristic line, which results from coordinating the clutch pressure with the vehicle inclination and the vehicle load, is stored in an electronic unit.

In development of the invention it is proposed to take into account the load condition of the vehicle in the control. Compared to an unloaded vehicle, the load produces a change of the axle load. The distribution of the load is different for the front and rear axles. The inclination of the vehicle thereby changes and causes an adulteration of the signal of the gradient sensor. This misinformation produces a higher drive torque. The misinformation is corrected by a signal which is a function of the vehicle load. The signal of a light-range regulation of the vehicle headlights or the signal of a level adjustment of the vehicle can be used as a standard for the load condition of the vehicle. Likewise, sensors can be used which measure the distance of the vehicle from the road.

DESCRIPTION OF THE PREFERRED EMBODIMENT

Figure 1:
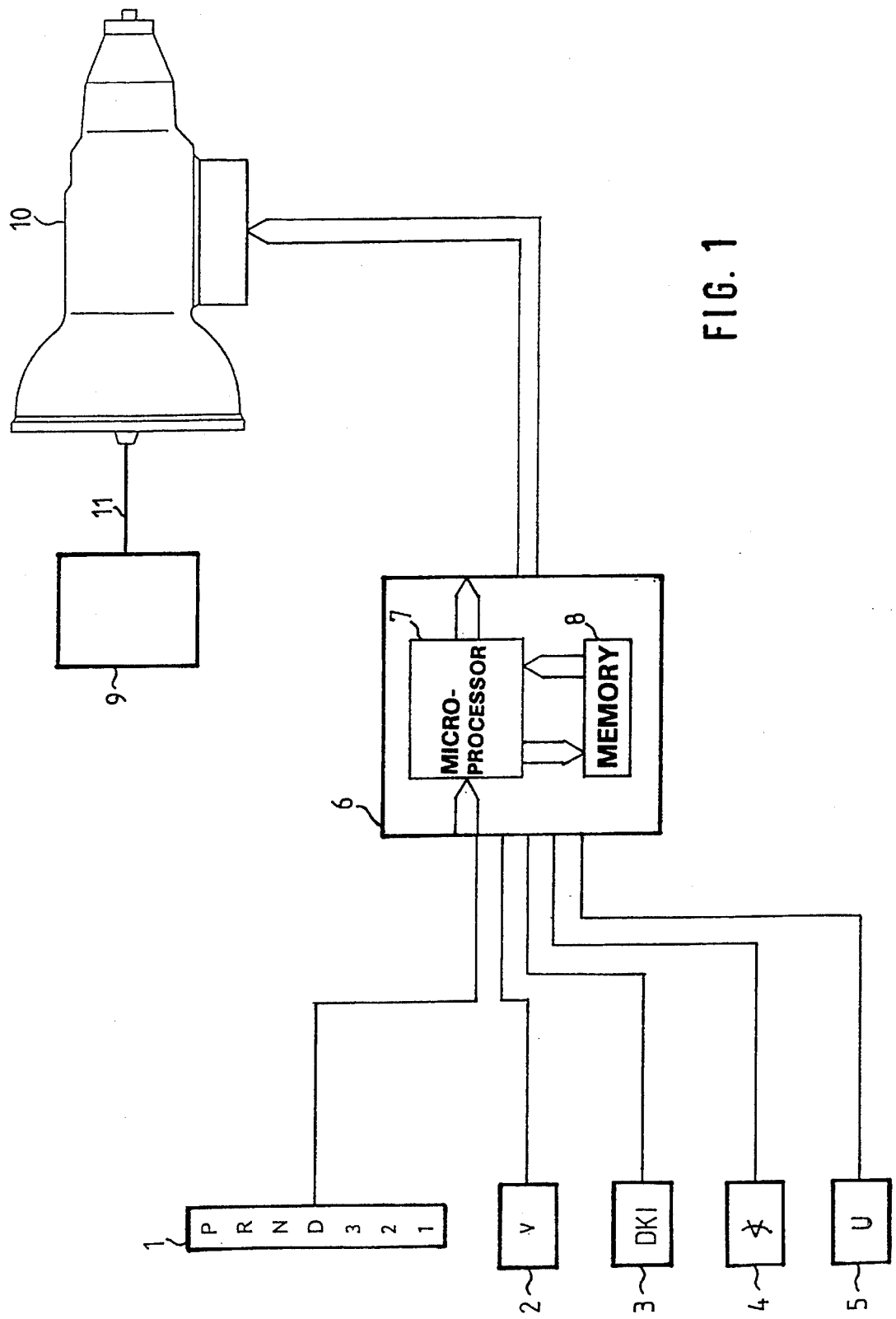
FIG. 1 shows block diagram of the construction of the control device.

FIG. 1 shows an automatic transmission 10 which is connected by an input shaft 11 with an engine 9. The transmission 10 has clutches, not shown, the torque transmission of which is determined by electrical hydraulic actuators, not shown. Said actuators are controlled by an electronic control unit 6 which has at its disposal a microprocessor 7 for signal processing together with a memory 8 in which instructions for coordinating the clutch pressure with the vehicle load and the vehicle inclination are stored. Input quantities for the electronic control unit 6 are: a signal from a speed-range selector 1, the signal v from a speed sensor 2 which stands for the vehicle velocity, the signal DKI from an engine throttle valve 3, the signal from a gradient sensor 4, and the signal of a vehicle light-range regulation or vehicle level regulation, or the signals from distance sensors 5.

Figure 2:
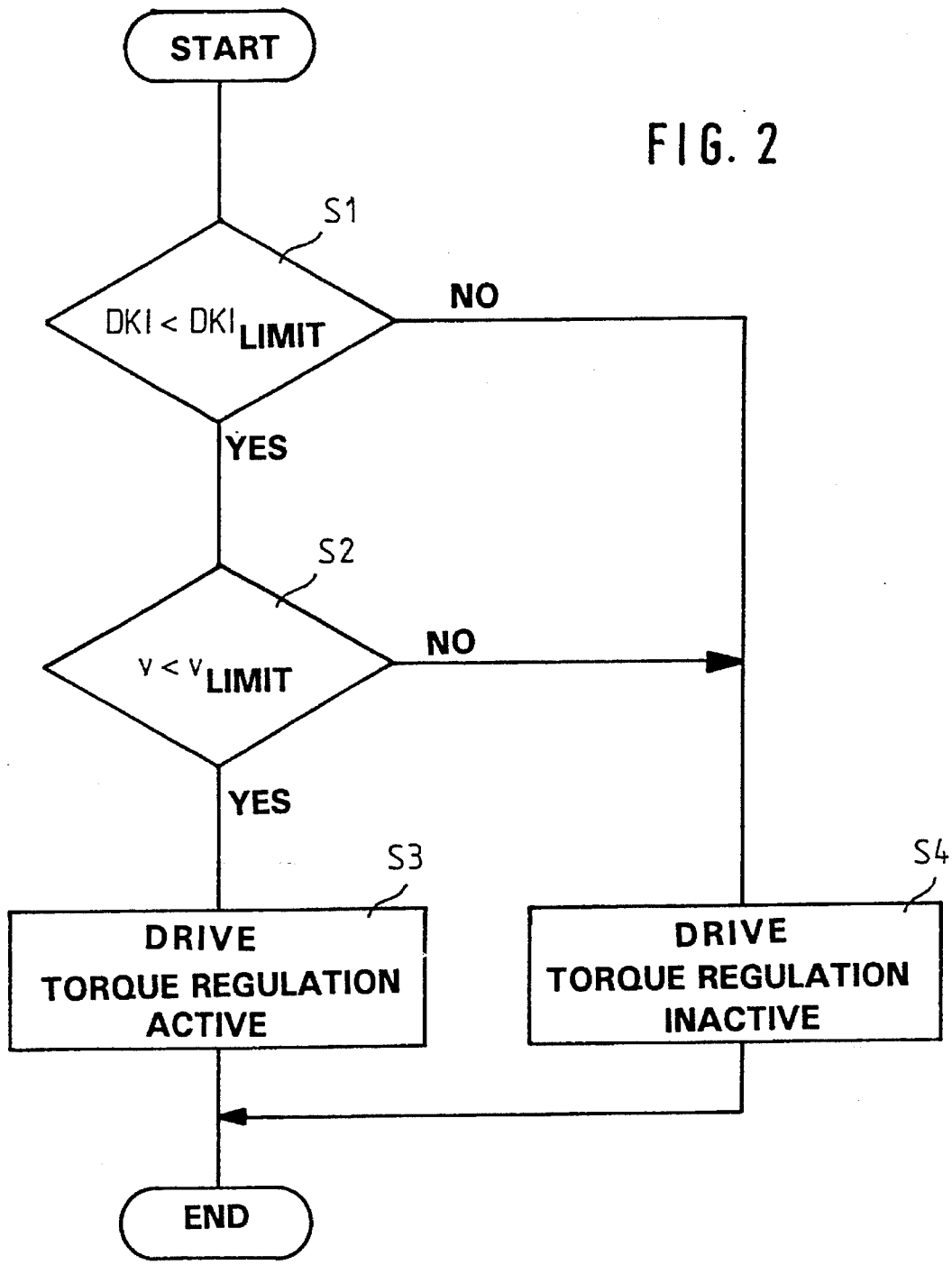
FIG. 2 shows a flow chart of the program for the vertical uncoupling.

FIG. 2 shows the flow chart of the vertical uncoupling program. The program is activated upon engagement of a driving step. Step S1 tests whether the actual throttle valve setting DKI is below a given threshold DKI-LIMIT. Step S2 tests whether the actual vehicle velocity v is below a threshold v-LIMIT. Both thresholds are at zero or near zero. The inquiries from S1 and S2 are satisfied for the travel conditions that follow: braking or stopping the vehicle shortly before downtime, for example, in order to stop at traffic light; vehicle firmly braked, for example, at a stop sign. If the inquiries from S1 and S2 are answered affirmatively, the drive torque adjustment is effected at step S3. If one of the two conditions is not met, a drive torque adjustment is omitted in step S4. This comprises all other travel conditions such as accelerations or starting operation, braking, and coasting operation when traveling downhill. A drive torque adjustment is not suitable during said conditions.

The adjustment of the drive torque is terminated when the vehicle is accelerated or with abandonment of the driving step. The program remains activated even when the vehicle velocity and the engine throttle valve setting exceed the threshold.

Reference numerals
1 gear selector
2 velocity sensor
3 engine throttle cap sensor
4 gradient sensor
5 signal of light-range regulation, level regulation or distance sensors
6 electronic control unit
7 microprocessor
8 memory
9 engine
10 transmission
11 input shaft transmission
S1 step
S2 step
S3 step
S4 step

I claim:
1. An electronic control process for a vehicle with an automatic transmission (10) having a clutch, lying in the power path, controlled by a microprocessor (7), a gear selector (1), a sensor (2) which detects a velocity of the vehicle, a sensor (3) which detects an engine throttle valve setting, and a sensor (4) which detects an inclination of the vehicle, and said microprocessor (7), with a vehicle velocity of zero or near zero and an engine throttle setting of zero or near zero, regulating the clutch lying in the power path such that the transmitted torque compensates for influences resulting from the vehicle inclination, with a weight of the vehicle and a load being taken into account for the control of the clutch, said process comprising the steps of:

determining the inclination of the vehicle with respect to the road; and using the inclination of the vehicle with respect to the road to regulate the clutch lying in the power path.

2. An electronic control process according to claim 1, further comprising the step of using a level regulating device to detect the inclination of the vehicle with respect to the road.

3. An electronic control process according to claim 1, further comprising the step of using distance sensors (5) to detect the inclination of the vehicle with respect to the road.

4. An electronic control process according to claim 1, further comprising the step of using a range of an output of headlights of the vehicle relative to the road to detect the inclination of the vehicle with respect to the road.

* * * * *